R. MONTFORT.
Seed-Planters and Fertilizer-Distributors.
No. 143,832. Patented Oct. 21, 1873.
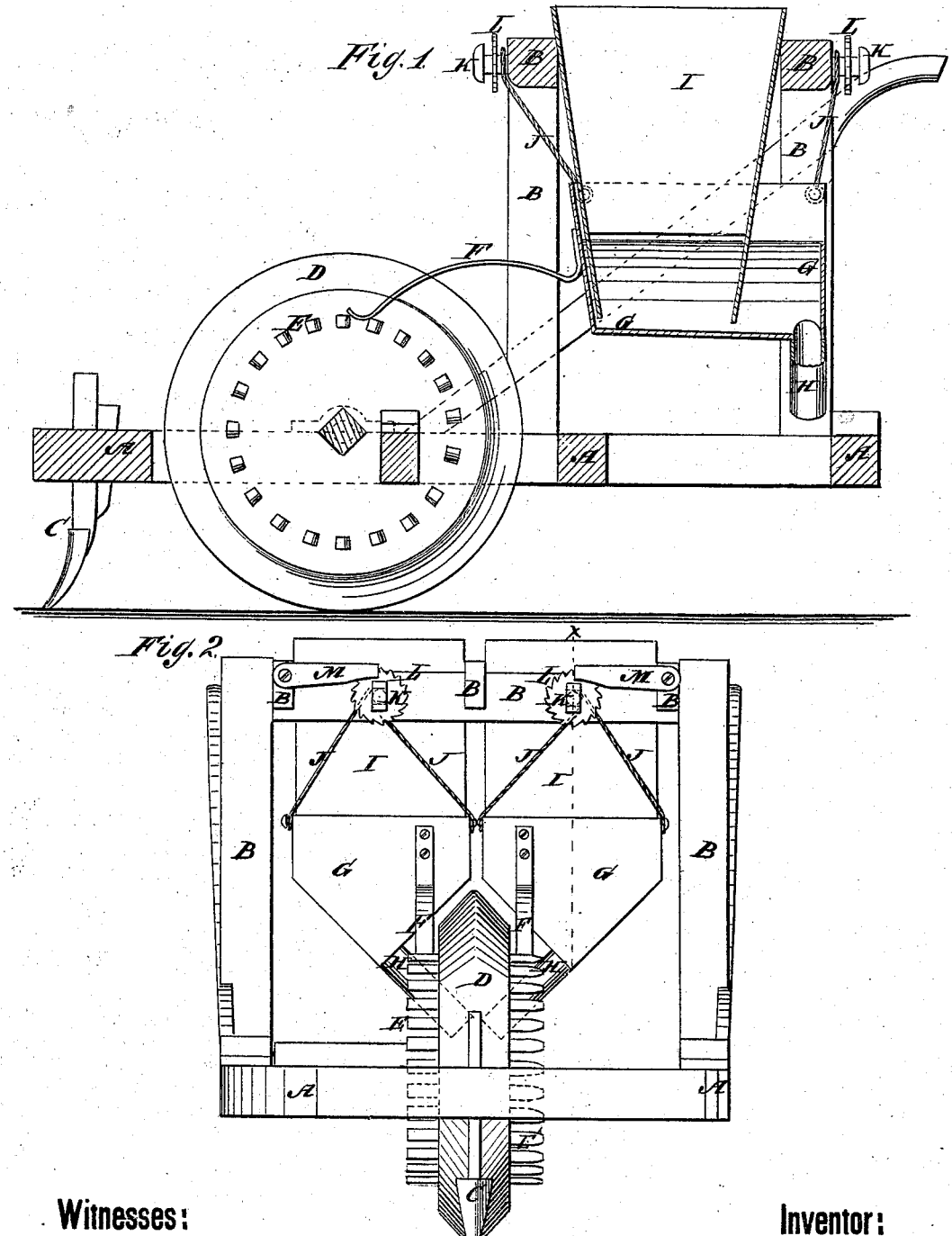

UNITED STATES PATENT OFFICE.

RICHARDSON MONTFORT, OF BUTLER, GEORGIA.

IMPROVEMENT IN SEED-PLANTERS AND FERTILIZER-DISTRIBUTERS.

Specification forming part of Letters Patent No. 143,832, dated October 21, 1873; application filed May 24, 1873.

*To all whom it may concern:*

Be it known that I, RICHARDSON MONTFORT, of Butler, in the county of Taylor and State of Georgia, have invented a new and useful Improvement in Seed-Planter and Fertilizer-Distributer, of which the following is a specification:

Figure 1 is a vertical longitudinal section of my improved machine, taken through the line $x$ $x$, Fig. 2. Fig. 2 is a front view of the same.

Similar letters of reference indicate corresponding parts.

My invention relates to an arrangement of vertically-adjustable shoes or supplementary seed-distributing hoppers with stationary receiving-hoppers, as hereinafter described, whereby the delivery of seed from the latter to the former may be conveniently and perfectly controlled or stopped altogether, as required.

A is the base-frame, with which the operating parts of the machine are connected. B is the upright frame-work that supports the hoppers. To the forward part of the frame A is attached a plow, C, to open a furrow to receive the seed and fertilizer. D is the drive-wheel, the journals of which revolve in bearings attached to the frame A in such positions that the wheel D may follow directly in the rear of the plow C, and in the furrow opened by said plow. The face of the wheel D is made V-shaped, so that it may press back the sides of the furrow and prevent the soil from falling in before the seed and fertilizer have been deposited. To the sides of the wheel D are attached circles of cogs E, upon which rest the arms F attached to the distributing-shoes G, so that the said shoes may be jarred, to cause the seed and fertilizer to pass out, by the advance of the machine. The shoes G are made V-shaped in their cross-section, and are provided with spouts H at their rear ends, so arranged as to guide the seed and fertilizer into the furrow. I I are the two hoppers, which are made tapering to fit into the spaces between the top bars of the frame B and be supported by said top bars. The rear sides of the hoppers I project downward, and are made V-shaped, to correspond with the shape of the shoes G, so that, by raising or lowering the said shoes, more or less seed and fertilizer may be allowed to pass out. To each corner of the shoes G is attached the lower end of a cord or strap, J. The two cords or straps J, at each end of each shoe, are attached to a pin, K, which pins are swiveled to the front and rear top bars of the frame B. To each pin K is attached a ratchet-wheel, L, with the teeth of which the pawl M engages, to hold the said pins K securely in any position into which they may be turned.

By this construction the amount of seed and fertilizer distributed may be regulated by raising and lowering the rear ends of the shoes G and adjusting the forward ends of said shoes so that the arms F may bear properly upon the cogs E of the wheel D. By raising the hoppers G until they press against the lower end of hoppers I, the seed will be prevented from escaping altogether, thus enabling the machine to be moved from one point to another, over ground upon which it is not desired to discharge the seed.

Having thus described my invention, I claim as new and desire to secure by Letters Patent—

The vertically-adjustable supplementary distributing-hoppers G and an adjusting apparatus, as described, in combination with the stationary receiving-hoppers I, having a form at their lower ends corresponding with that of the movable hoppers, whereby the discharge of seed may be regulated in quantity or entirely arrested, as set forth.

RICHARDSON MONTFORT.

Witnesses:
W. H. JENKINS,
JAMES D. RUSS,
G. H. HOLSEY.